US012560810B2

(12) United States Patent
Kim

(10) Patent No.: US 12,560,810 B2
(45) Date of Patent: Feb. 24, 2026

(54) BIASING USER FOCUS BASED ON CONTENT RENDERING

(71) Applicant: Apple Inc., Cupertino, CA (US)

(72) Inventor: Nahckjoon Kim, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/820,122

(22) Filed: Aug. 29, 2024

(65) Prior Publication Data

US 2025/0110334 A1     Apr. 3, 2025

Related U.S. Application Data

(60) Provisional application No. 63/541,752, filed on Sep. 29, 2023.

(51) Int. Cl.
*G02B 27/01* (2006.01)
*G06F 3/01* (2006.01)

(52) U.S. Cl.
CPC ......... *G02B 27/0101* (2013.01); *G06F 3/013* (2013.01); *G02B 2027/0136* (2013.01)

(58) Field of Classification Search
CPC ........ G02B 27/0101; G02B 2027/0136; G06F 3/013
See application file for complete search history.

(56) References Cited

U.S. PATENT DOCUMENTS

| | | | |
|---|---|---|---|
| 2017/0169612 A1* | 6/2017 | Cashen | ................. B60K 35/60 |
| 2022/0075187 A1* | 3/2022 | Grahsl | ............... G06F 3/04815 |
| 2023/0359272 A1* | 11/2023 | Green | ................... G02C 7/083 |

* cited by examiner

*Primary Examiner* — Brent D Castiaux
(74) *Attorney, Agent, or Firm* — BAKERHOSTETLER

(57) ABSTRACT

An electronic device may perform an operation to content (e.g., virtual content) that causes a stereo offset to the content, thus causing the content to become out of focus to a user. For example, based on the stereo offset the user may experience double vision when viewing the content. The operation may include a stereo offset that causes a misalignment of an image presented on a display for the user's left eye and a display for the user's right eye. By causing the user to experience double vision or otherwise perceive the content out of focus, the user may be more inclined to view other content, which may include targeted content by the electronic device.

23 Claims, 10 Drawing Sheets

300

| OBTAIN, FOR PROVIDING ON A STEREOSCOPIC DISPLAY OF AN ELECTRONIC DEVICE, FIRST CONTENT AND SECOND CONTENT | 302 |

| DETERMINE THE FIRST CONTENT IS PRIORITIZED OVER THE SECOND CONTENT FOR VIEWING BY A USER OF THE STEREOSCOPIC DISPLAY | 304 |

| APPLY A STEREOSCOPIC DISTORTION TO THE SECOND CONTENT | 306 |

400

IDENTIFY FIRST CONTENT AND SECOND CONTENT PRESENTED BY A STEREOSCOPIC DISPLAY — 402

OBTAIN GAZE INFORMATION ASSOCIATED WITH A USER VIEWING THE DEVICE — 404

DETERMINE, BASED ON THE GAZE INFORMATION, THE FIRST CONTENT IS PRIORITIZED — 406

IN RESPONSE TO DETERMINING THE FIRST CONTENT IS PRIORITIZED, PERFORM AN OPERATION TO CAUSE A MISALIGNMENT OF THE SECOND CONTENT — 408

500

| PRESENT, ON A STEREOSCOPIC DISPLAY, AN ENVIRONMENT THAT COMPRISES REAL WORLD CONTENT | 502 |

| PRESENT, ON THE STEREOSCOPIC DISPLAY, VIRTUAL CONTENT | 504 |

| PERFORM A STEREO OFFSET THAT CAUSES A MISALIGNMENT OF THE VIRTUAL CONTENT ON THE STEREOSCOPIC DISPLAY | 506 |

600

OBTAIN, FROM AN IMAGE SENSOR, EYE TRACKING DATA — 602

DETERMINE, BASED ON THE EYE TRACKING DATA, A FIRST DEPTH FROM A FIRST OBJECT — 604

DETERMINE A SECOND DEPTH FROM A SECOND OBJECT PRESENTED ON A DISPLAY — 606

APPLY, BASED ON THE FIRST DEPTH, A STEREO DISTORTION TO THE SECOND OBJECT — 608

BIASING USER FOCUS BASED ON CONTENT RENDERING

CROSS REFERENCE TO RELATED APPLICATION(S)

The present application claims the benefit of U.S. Provisional Application No. 63/541,752, entitled "BIASING USER FOCUS BASED ON CONTENT RENDERING", filed Sep. 29, 2023, the entirety of which is incorporated herein for reference.

TECHNICAL FIELD

This application is directed to electronic devices that present virtual content, and more particularly, to mixed reality (MR) devices that utilize a stereo offset to misalign virtual content and cause a user of the MR device to focus on other content.

BACKGROUND

Some electronic devices can run an application (software application) that generates virtual content in the form of virtual objects presented on a display. Additionally, the electronic device may present a real world environment with real world content on the display. In some instances, it may be desirable for a user of the electronic to focus on the real world content. However, based on the position of the virtual content relative to the real world content, some users may have difficulty focusing on the real world content. For example, when the virtual content is presented in a manner such that the virtual content has the same focal depth (relative to a user) as the real world content, some users may not focus on the real world content, and switch focus back and forth between the virtual content and the real world content.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
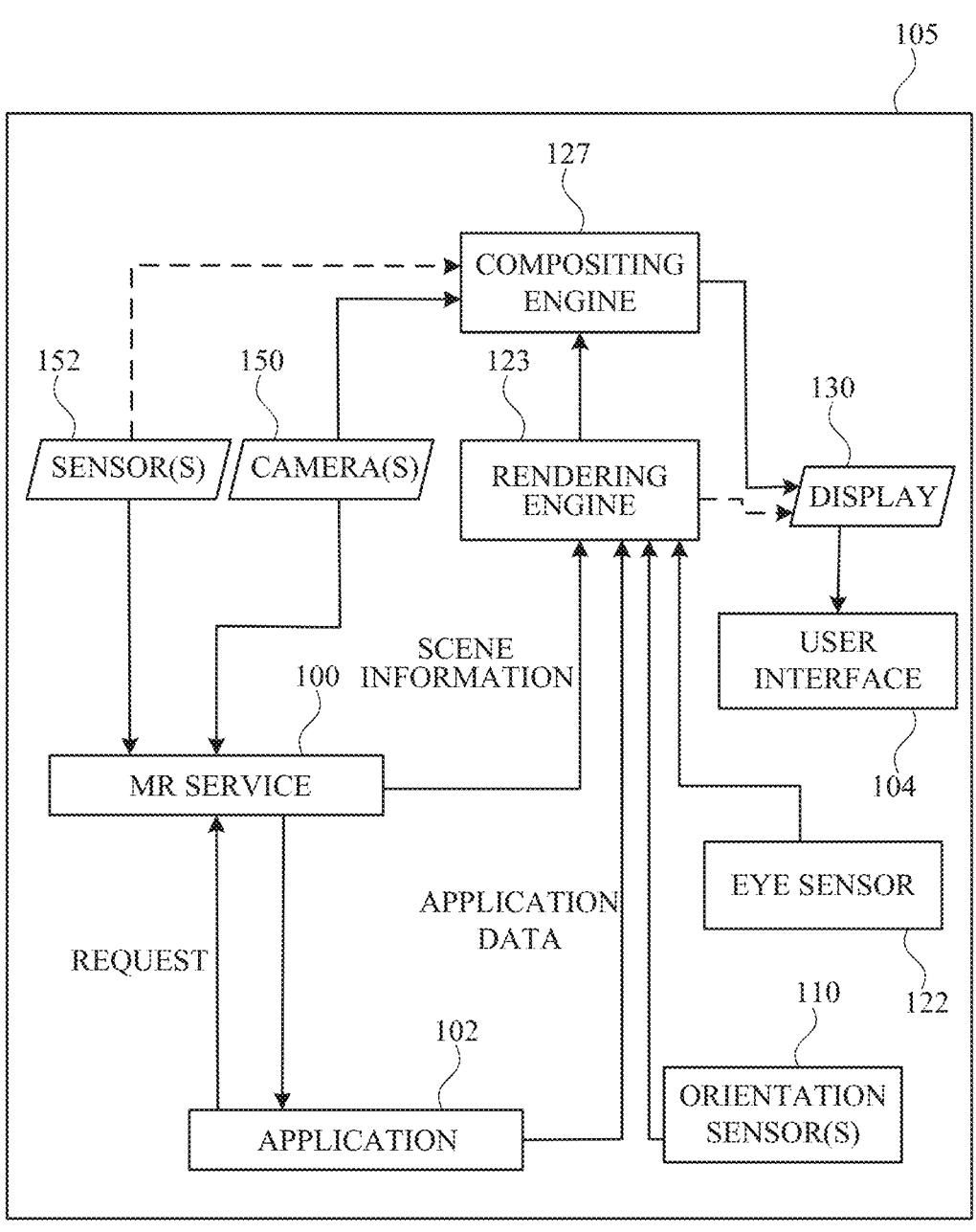
FIG. 1 illustrates an example system architecture of an electronic device implementing the subject technology, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to applying a stereo offset to content (e.g., virtual content) in order to help the user's eyes focus on other content or real-world objects. Electronic devices, such as MR devices, described herein may incorporate multiple displays used as a stereoscopic display, with each display presenting content with a stereo offset to account for binocular disparity of a user's eyes. The stereo offset may create a perception of depth to the user, thus rendering the content from multiple displays as a single image (e.g., three-dimensional image). While an electronic device may provide a stereo offset for binocular disparity, the stereo offset described herein refers to an additional stereo offset to specified content to intentionally misalign the focus of the user's eyes and help to redirect the user's eyes to a desired location (e.g., another object). In this regard, the additional stereo offset may simulate distortion effects of double vision or cross-eyed focus that would otherwise occur when the user focuses on other content located at different depths. As a result of the additional stereo offset, the electronic device may help to redirect the user's eyes to focus on other content (e.g., targeted content from and/or selected by the electronic device). Moreover, in one or more implementations, electronic devices described herein may target particular content (e.g., real world content, virtual content) for a user of the MR device to focus on and apply the additional stereo offset to content that is not targeted for viewing by the user. The targeted content may be properly presented to the user (e.g., with stereo disparity representative of the depth at which the targeted content is placed), thus making it easier for the user to focus on as compared to the content with the additional stereo offset.

In one or more implementations, an MR device can determine a difference between depth between a real-world object viewed through a see-through display and a depth (e.g., perceived depth) of a virtual object presented on the see-through. Also, an MR device may determine based on, for example, gaze tracking data, that the user is focused on the real-world object, and determine the real-world object is targeted content by the user. When the MR device determines, based on the depth disparity, that the virtual object appears closer than the real-world object, the MR device may apply an additional stereo offset designed to simulate the effects of double vision to a user. Conversely, when the MR device determines, based on the depth disparity, that the virtual object appears further than the real-world object, the MR device may apply an additional stereo offset designed to simulate the effects of divergence to a user, which may also simulate distortion effects. Beneficially, MR devices described herein may facilitate the user to focus on targeted content.

Additionally or alternatively, electronic devices described herein may rely on gaze information to track eye movement of the user and determine what the user is focused on, and apply the additional stereo offset to content on which the user is not focused. As another example, electronic devices described herein may present virtual content such as a notification (e.g., alert or high-priority content), and apply an additional stereo offset to content other than the notification. Based on the additional stereo offset, the electronic device may cause the user to focus on the notification and away from the other content.

These and other embodiments are discussed below with reference to FIGS. 1-11. However, those skilled in the art will readily appreciate that the detailed description given herein with respect to these Figures is for explanatory purposes only and should not be construed as limiting.

FIG. 1 illustrates an example system architecture of an electronic device 105 implementing the subject system, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 105 may be smart phone, a tablet device, or a wearable device such as a head mountable portable system, which includes a display system capable of presenting a visualization of an MR environment to a user. The electronic device 105 may be powered with a battery and/or any other power supply. In an example, the electronic device 105 includes a display 130 that provides a stereoscopic presentation of an MR environment, enabling a three-dimensional visual display of a rendering of a particular scene, to the user.

The electronic device 105 may include one or more cameras 150 (e.g., visible light cameras, infrared cameras, etc.). Further, the electronic device 105 may include one or more sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for interacting with virtual content displayed within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

For explanatory purposes, portions of the architecture of FIG. 1 are described as being implemented by the electronic device 105 of FIG. 1, such as by a processor and/or memory of the electronic device. Various portions of the architecture of FIG. 1 can be implemented in software or hardware, including by one or more processors and a memory device containing instructions, which when executed by the processor cause the processor to perform the operations described herein. For example, in FIG. 1, the trapezoidal boxes may indicate that the sensors 152, the one or more cameras 150 and the display 130 may be hardware components, and the rectangular boxes may indicate that the MR service 100, the application 102, the rendering engine 123, and the compositing engine 127 (e.g., compositor) may be implemented in software, including by one or more processors and a memory device containing instructions, which when executed by the processor cause the processor to perform the operations described herein.

In the example of FIG. 1, the application 102 may provide application data to a rendering engine 123 for rendering of the application data, such as for rendering of the UI of the application. The application 102 may be a gaming application, a media player application, a content-editor application, a training application, a simulator application, a social media application, or generally any application that provides a UI or other content for display at a location that depends on the physical environment, such as by anchoring the UI or other content to an anchor in the physical environment. The application data may include application-generated content (e.g., windows, buttons, tools, characters, images, videos, etc.) and/or user-generated content (e.g., text, images, etc.), and information for rendering the content in the UI. In one or more implementations, the rendering engine 123 renders the UI 104 for display by a display such as display 130 of the electronic device 105. In one or more implementations, the MR service 100 may assign a portion of a physical environment of the electronic device to the application 102 (e.g., while the application 102 is running on the electronic device 105 and while the UI 104 is displayed by the display 130.

As shown in FIG. 1, additional information may be provided for display of the UI of the application 102, such as in a two-dimensional or three-dimensional (e.g., MR) scene. In the example of FIG. 1, the one or more sensors 152 may provide physical environment information (e.g., depth information from one or more depth sensors, motion information from one or more motion sensors), and/or user information to an MR service 100. The one or more cameras 150 may also provide images of a physical environment and/or one or more portions of the user (e.g., the user's eyes, hands, face, etc.) to the MR service 100. The MR service 100 may generate scene information, such as a three-dimensional map, of some or all of the physical environment of electronic device 105 using the environment information (e.g., the depth information and/or the images) from the one or more sensors 152 and the one or more cameras 150. The MR service 100 may also determine a gaze location based on images and/or other sensor data representing the position and/or orientation of the user's eye(s). The MR service 100 may also identify a gesture (e.g., a hand gesture) performed by a user of the electronic device 105, based on images and/or other sensor data representing the position and/or orientation of the user's hand(s) and/or arm(s).

As illustrated in FIG. 1, in one or more implementations, the application 102 may provide a request to the MR service 100. For example, the request may be a request for scene information (e.g., information describing the content of the physical environment), and/or a request for user information such as a request for a gaze location and/or user gesture information. In one example, the request may be an anchor request for a physical anchor (e.g., a horizontal surface, a vertical surface, a floor, a table, a wall, etc.).

The application 102 may include code that, when executed by one or more processors of electronic device 105, generates application data, for display of the UI 104 on, near, attached to, or otherwise associated with an anchor location corresponding to the anchor identified by the identifier provided from MR service 100. The application 102 may include code that, when executed by one or more processors of the electronic device 105, modifies and/or updates the application data based on user information (e.g., a gaze location and/or a gesture input) provided by the MR service 100.

Once the application data has been generated, the application data can be provided to the MR service 100 and/or the rendering engine 123, as illustrated in FIG. 1. As shown, scene information can also be provided to rendering engine 123. The scene information provided from the MR service 100 to the rendering engine 123 can include or be based on, as examples, environment information such as a depth map of the physical environment, and/or object information for detected objects in the physical environment. The rendering engine 123 can then render the application data from the application 102 for display by the display 130 of electronic device 105 to appear at a desired location in a physical environment. For example, a representation of the UI 104 may be rendered for display at the appropriate location on the display 130, to appear to be located at a desired location in the physical environment, using the application data and using the scene information from the MR service 100 (which may include scene information for other portions of the physical environment).

In one or more implementations, the display 130 may be, for example, a see-through display (e.g., transparent display, translucent display, partially transparent display). The UI 104 may be rendered for display at a location on the display 130 corresponding to a direct view, through the see-through display, of the physical environment.

As shown, in one or more implementations, the electronic device 105 may further include a compositing engine 127. In several examples shown and described herein, the compositing engine 127 may modify the virtual depth of a virtual object by adjusting the disparity between the virtual object displayed to each eye of a user of the electronic device 105, such as in a stereoscopic display mode. In one or more implementations, this may include adjusting the disparity to adjust the virtual depth of one virtual object relative to another virtual object.

Although the example of FIG. 1 illustrates the rendering engine 123 as being separate from the MR service 100, it should be appreciated that the MR service 100 and the rendering engine 123 may form a common service and/or that rendering operations for rendering content for display can be performed by the MR service 100. Although the example of FIG. 1 illustrates the rendering engine 123 as being separate from application 102, it should be appreciated that, in some implementations, the application 102 may render content for display by the display 130 without using a separate rendering engine. Although the application 102 is depicted as a single application in FIG. 1, it is appreciated that the application 102 may represent multiple applications running concurrently on the electronic device 105 and generating application data for rendering of respective UIs for display by display 130. In one or more implementations, the compositing engine 127 may composite application data for multiple UIs of multiple applications for concurrent display.

The electronic device 105 may include one or more orientation sensors 110 for detecting orientation and/or movement of the electronic device 105 and/or the one or more displays 130. For example, the electronic device 105 may use the one or more orientation sensors 110 to track changes in the position and/or orientation of the electronic device 105 and/or the one or more displays 130, such as with respect to physical elements in the physical setting. The one or more orientation sensors 110 optionally include one or more gyroscopes and/or one or more accelerometers. Additionally, the electronic device 105 may further include an eye sensor 122 that track the gaze location of each of the user's eyes and/or the location at which the gaze directions of the user's eye converge (e.g., at a gaze plane).

Figure 2A:
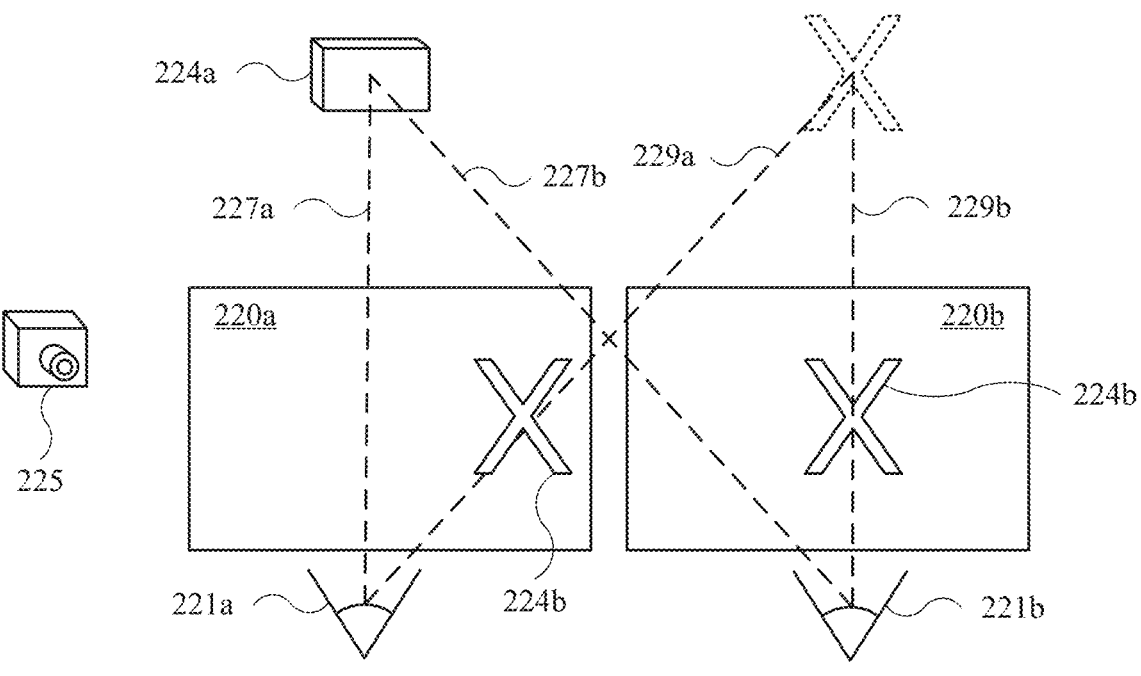
FIG. 2A illustrates a perspective view of an example of displays of an electronic device presenting content, in accordance with aspects of the present disclosure.

FIG. 2A illustrates a perspective view of an example of displays of an electronic device presenting content, in accordance with aspects of the present disclosure. As shown, a display 220a and a display 220b may be viewable by a left eye 221a and a right eye 221b, respectively, of a user. In one or more implementations, the displays 220a and 220b are integrated with an MR device and generate content (e.g., virtual content) for users. Further, each of the displays 220a and 220b takes the form of a see-through display. Accordingly, objects, such as an object 224a, may include a real-world object (e.g., object in a real environment), are viewable by a left eye 221a and a right eye 221b through the display 220a and the display 220b, respectively. Also, In this regard, the display 220a may present a left eye image (or images) and the display 220b may present a right eye image (or images). The displays 220a and 220b may include any features and functions described for the display 130 (shown in FIG. 1). Also, each of the displays 220a and 220b may present an object 224b. In one or more implementations, the object 224b is a virtual object based on virtual content. The object 224b may be generated by a rendering engine (e.g., rendering engine 123 shown in FIG. 1) and/or by a compositor (e.g., compositing engine 127 shown in FIG. 1).

The object 224a may take the form of a rectangle, as a non-limiting exemplary object. Further, the object 224b may take the form of a letter (e.g., X), as a non-limiting exemplary object. In one or more implementations, the objects 224a and 224b may be presented differently, in terms of position, on the displays 220a and 220b to account for a disparity (e.g., binocular disparity) between the left eye 221a and right eye 221b of a user. In this regard, a stereo offset may be applied to account for the disparity, and to cause a user to perceive the objects 224a and 224b as having depth.

Figure 2B:
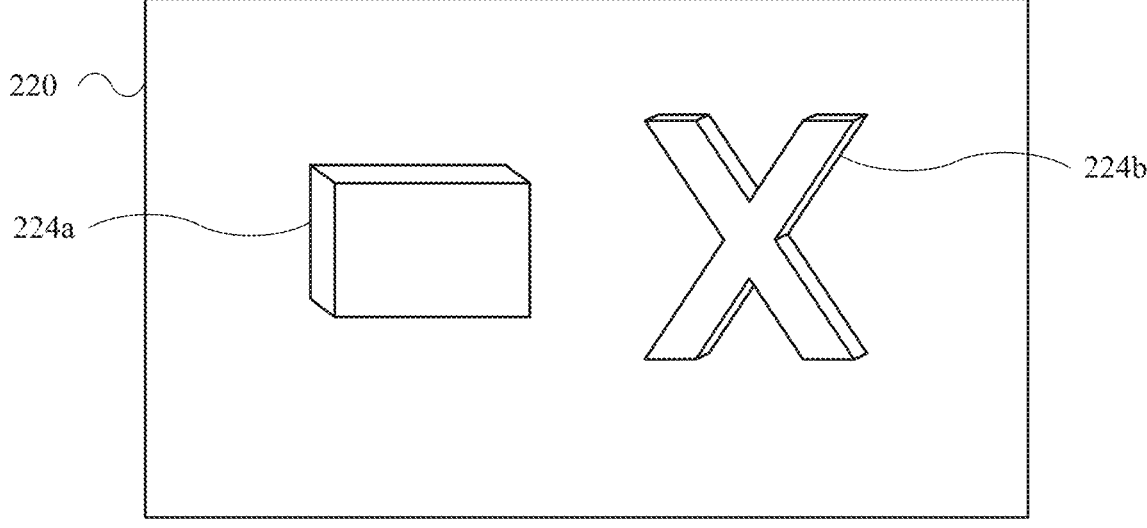
FIG. 2B illustrates a plan view showing the content from the displays shown in FIG. 2A in a stereoscopic display mode, in accordance with aspects of the present disclosure.

FIG. 2B illustrates a plan view showing the content from the displays 220a and 220b shown in FIG. 2A in a stereoscopic display mode, in accordance with aspects of the present disclosure. As shown, a representation 220 combines the displays 220a and 220b (shown in FIG. 2A). By nature, the object 224a (e.g., real-world object) may appear as a three-dimension object to a user. Using a stereoscopic display mode, an electronic device can present the object 224b on the displays 220a and 220b (shown in FIG. 2A) such that a user perceives the object 224b as a three-dimensional image as seen by the left eye 221a and the right eye 221b (shown in FIG. 2A) of the user. Accordingly, based on the stereoscopic display mode, content rendered on the displays 220a and 220b may be perceived by a user as having depth. For example, the object 224b may take the form of a three-dimensional letter (e.g., three-dimensional X).

Referring again to FIG. 2A, based on the respective positions, the displays 220a and 220b are closer to the left eye 221a and the right eye 221b than the object 224a. Accordingly, the object 224b, presented on the displays 220a and 220b, is physically closer to the left eye 221a and the right eye 221b than the object 224a. In some instances, an electronic device may desire the objects 224a and 224b to appear at the same depth to the left eye 221a and the right eye 221b. However, due to the position of the displays 220a and 220b relative to the object 224a, the object 224b may appear closer to the left eye 221a and right eye 221b than the object 224a, thus hindering a user's ability to focus on the object 224a.

The electronic device may include an image sensor 225 (representative of one or more images sensors) designed to view and capture data (e.g., eye tracking data) of the left eye 221a and the right eye 221b. Using the data from the image sensor 225, the electronic device may determine a vector 227a, representing a distance between the left eye 221a and the object 224a. The electronic device may use the image sensor 225 to further determine a vector 227b, representing a distance between the right eye 221b and the object 224a. Using the vectors 227a and 227b, the electronic device may determine a vengeance distance, or current focal distance at which the left eye 221a and the right eye 221b are converging. Additionally, the electronic device may determine a vector 229a, representing a distance between the left eye 221a and the object 224b on the display 220a. Also the electronic device may determine a vector 229a and a vector 229b. Although the object 224b is presented on the displays 220a and 220b, the vectors 229a and 229b may be used to determine a perceived depth of the object 224b to the user.

Using the vectors 227a and 227b and the vectors 229a and 229b, the electronic device may determine the relative depth between the object 224a and the object 224b. In some instances, the electronic device may determine the object 224b is closer (e.g. less depth) than the object 224a, and perform an additional stereo offset to the object 224b, which may redirect the user's focus to the object 224a.

Figure 3A:
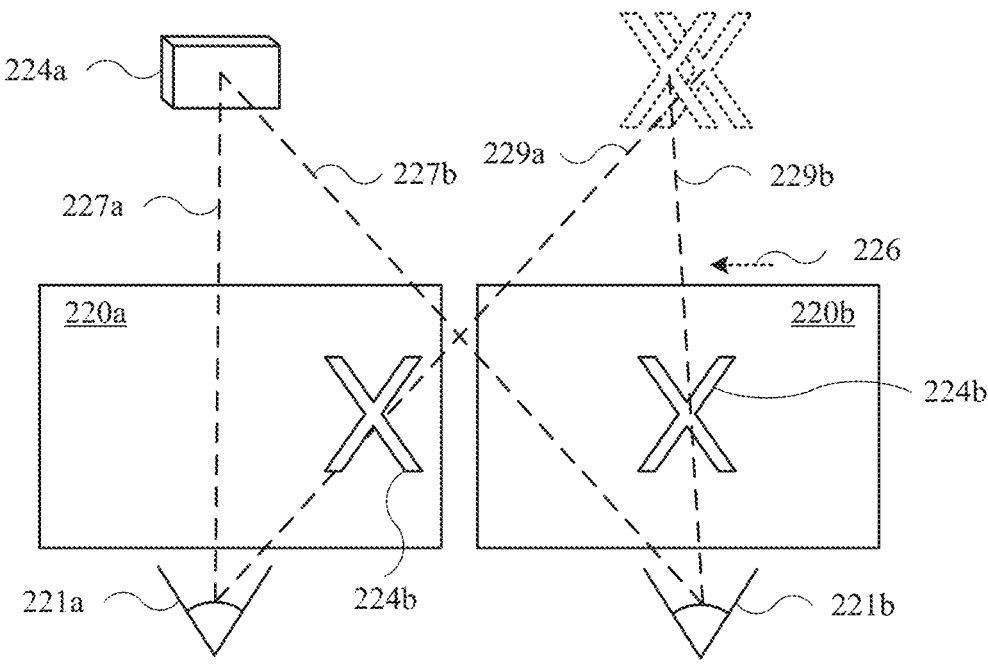
FIG. 3A illustrates a perspective view of an example of displays of an electronic device, further showing an operation performed on the content, in accordance with aspects of the present disclosure.

FIG. 3A illustrates a perspective view of an example of displays 220a and 220b of an electronic device, further showing an operation performed on the object 224b, in accordance with aspects of the present disclosure. In one or more implementations, the operation includes an additional stereo offset applied to the object 224b. The additional stereo offset represents a stereo offset performed on top of a stereo offset used to account for binocular disparity. In other words, the stereo offset between images of an object that would otherwise have been used to depict that object at a desired depth, is further modified to introduce this additional stereo offset. For example, the electronic device may displace the object 224b on at least one of the display 220a or the display 220b. As shown in FIG. 3A, the object 224b is displaced in a direction of an arrow 226 on the display 220b. By applying the additional stereo offset to the object 224b, the electronic device may help the user to focus on the object 224a, which may be targeted content selected for the user to view by the electronic device.

Figure 3B:
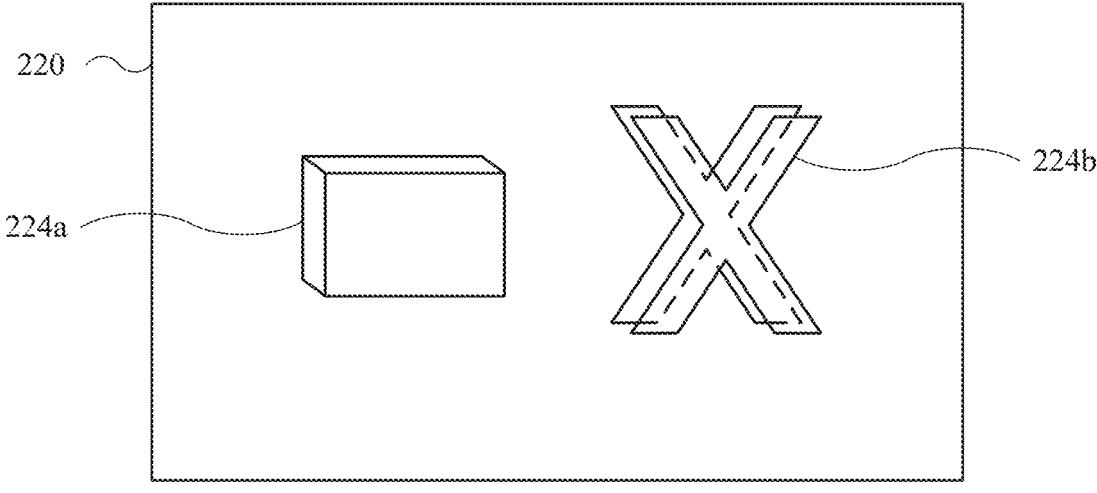
FIG. 3B illustrates a plan view showing the representation of the content in a stereoscopic display mode, subsequent to applying the additional stereo offset to the object, in accordance with aspects of the present disclosure.

FIG. 3B illustrates a plan view showing the representation 220 of the content in a stereoscopic display mode, subsequent to applying the additional stereo offset to the object 224b, in accordance with aspects of the present disclosure. The additional stereo offset may cause a misalignment or distortion between two images (e.g., from the displays 220a and 220b shown in FIG. 3A) of the object 224b. In this regard, an electronic device may simulate distortion effects of double vision or cross-eyed focus on the object 224b. Moreover, the electronic device may redirect the user's and help the user focus on the object 224a. Beneficially, the object 224a may include a targeted object, such as an object on which an electronic device intends the user to focus (e.g., a notification or high priority content).

When applying the additional stereo offset to the object 224b, the scale (e.g., dimensions) of the object 224b may not be changed while displaying the object 224b on the display 220a and/or the display 220b (shown in FIG. 3A). As a result, the perceived depth of the object 224b, when viewed by the user, is not altered. If desired, the transparency or clarity of object 224b may be altered to help simulate the effect of focus on other objects at different depths. For example, the rendered pixels of object 224b may be blurred (e.g., applying a post-processing Gaussian blur) or the transparency of object 224b may be increased (e.g., by adjusting the alpha of the rendered pixels of object 224b).

Electronic devices described herein may determine which content is currently being viewed by a user, and as a result, which content is not being viewed by a user. For example, an electronic device may include one or more sensors that track movement of the left eye 221a and the right eye 221b of the user. The electronic device may use the one or more sensors (e.g., one or more cameras 150, shown in FIG. 1) to generate gaze tracking information of the left eye 221a and the right eye 221b. For example, the gaze information may generate a gaze vector and a gaze vector for the left eye 221a and the right eye 221b (both shown in FIG. 3A), respectively. The respective directions of the gaze vectors and may be used to calculate a convergent point. As shown in FIG. 3A, the gaze vectors and may provide an indication the user is currently viewing the object 224a. Alternatively or in combination, electronic devices described herein may use bounding boxes (not shown in FIG. 3B) to provide an indication that the user (e.g., the left eye 221a and the right eye 221b) is viewing and focused on the object 224a. Also, an application (e.g., software application) running on the electronic device may desire the user focus on a particular object (e.g., the object 224a), and generate a request for the electronic device to apply the additional stereo offset to another object in the field of view of the user (e.g., the object 224b).

As another example for determining which content is in focus by a user, electronic devices described herein may separate a scene with content into different layers. For example, a scene may include a set of one or more objects assigned to a foreground layer. Further, the scene may include another set of one or more objects assigned to a background layer. The one or more objects in the foreground layer may include an object(s) being viewed by the user or a virtual object(s) in which it is requested (e.g., by an application running on the electronic device) the user focus on. The one or more objects in the background layer may be subject to an operation, such as an additional stereo offset operation to cause the object(s) to be perceived as out of focus by a user. In order to assign virtual objects to a foreground layer or a background layer, an application running on an electronic device may request the user focus on particular content (e.g., the object 224a), thus placing the content in the foreground layer. As a result, other content (e.g., the object 224b) may be placed in the background layer, which may subject the content (in the background layer) to an additional stereo offset.

Further, while the foregoing example of an additional stereo offset may simulate distortion effects of double vision, other distortion effects may occur in different situations. For example, in one or more implementations, when the object 224b is perceived as being further than the object 224a, an MR device may simulate another distortion effect, such as divergence. Accordingly, other distortion effect from an applied additional stereo offset may intentionally misalign the object 224b to cause an appearance of two objects.

Figure 4:
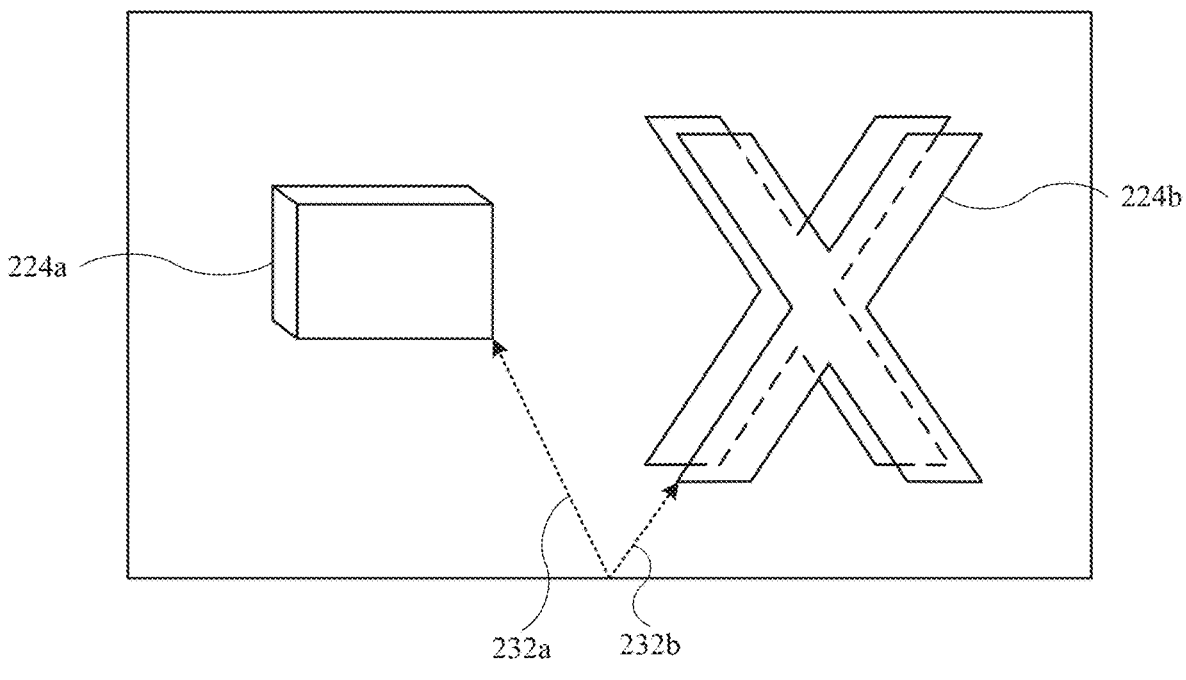
FIG. 4 illustrates a plan view showing the representation of the content in a stereoscopic display mode, showing the objects and their respective distances from a user, in accordance with aspects of the present disclosure.
Figure 5:
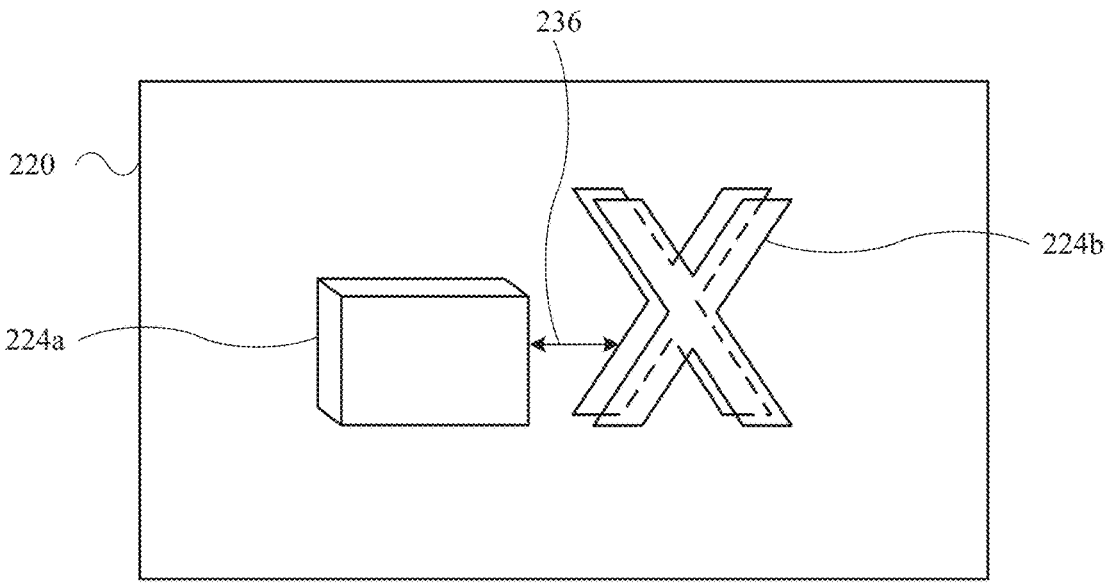
FIG. 5 illustrates a plan view showing the representation of the content in a stereoscopic display mode, showing the objects and separated by a distance, in accordance with aspects of the present disclosure.

FIG. 4 and FIG. 5 illustrate additional examples of applying an additional stereo offset in certain circumstances. The object 224a and the object 224b may include a real-world object and a virtual object, respectively.

FIG. 4 illustrates a plan view showing the representation 220 of the content in a stereoscopic display mode, showing the objects 224a and 224b and their respective distances from a user, in accordance with aspects of the present disclosure. As shown, the object 224a is at a distance 232a and the object 224b is at a distance 232b. The distance 232a may represent a focal distance from the object 224a (e.g., a real world object viewed through see-through displays), and the distance 232b may represent a perceived distance from the object 224b, as presented on a see-through display, to a user's eyes). As further shown, the distance 232b is less than the distance 232a. As a result, the object 224b may be perceived by a user as being closer to the user than the object 224a. In one or more implementations, the additional stereo offset may be applied, including automatically applied, to the object 224b, which may simulate distortion effects of double vision or cross-eyed focus that would otherwise occur when the user focuses on other content (e.g., the object 224a) located at different depths.

FIG. 5 illustrates a plan view showing the representation 220 of the content in a stereoscopic display mode, showing the objects 224a and 224b separated by a distance 236, in accordance with aspects of the present disclosure. The distance of the object 224a and the (perceived) distance of the object 224b may be the same or substantially similar. However, due in part to the objects 224a and 224b appearing relatively close together, a user may experience difficulty focusing on the object 224a. In one or more implementations, the additional stereo offset may be applied, including automatically applied, to the object 224b to cause misalignment of two images of the object 224b, resulting in a user perceiving double vision or becoming cross-eyed when viewing the object 224b. In this regard, the distance 236 may represent a threshold distance such that when the objects 224a and 224b are separated by a distance that is less than or equal to the distance 236, an operation (e.g., additional stereo offset) is applied to the object 224b.

Additionally, an electronic device may subsequently request the user focus on the virtual content to which a stereo offset is applied. In the foregoing examples, the electronic device may subsequently request the user focus on the object 224b. When this occurs, the electronic device may remove or reduce the additional stereo offset applied to the object 224b, thus rendering the object 224b in focus. Moreover, the electronic device may apply the additional stereo offset to the object 224a, thus causing the user to perceive double vision when viewing the object 224a.

Figure 6A:
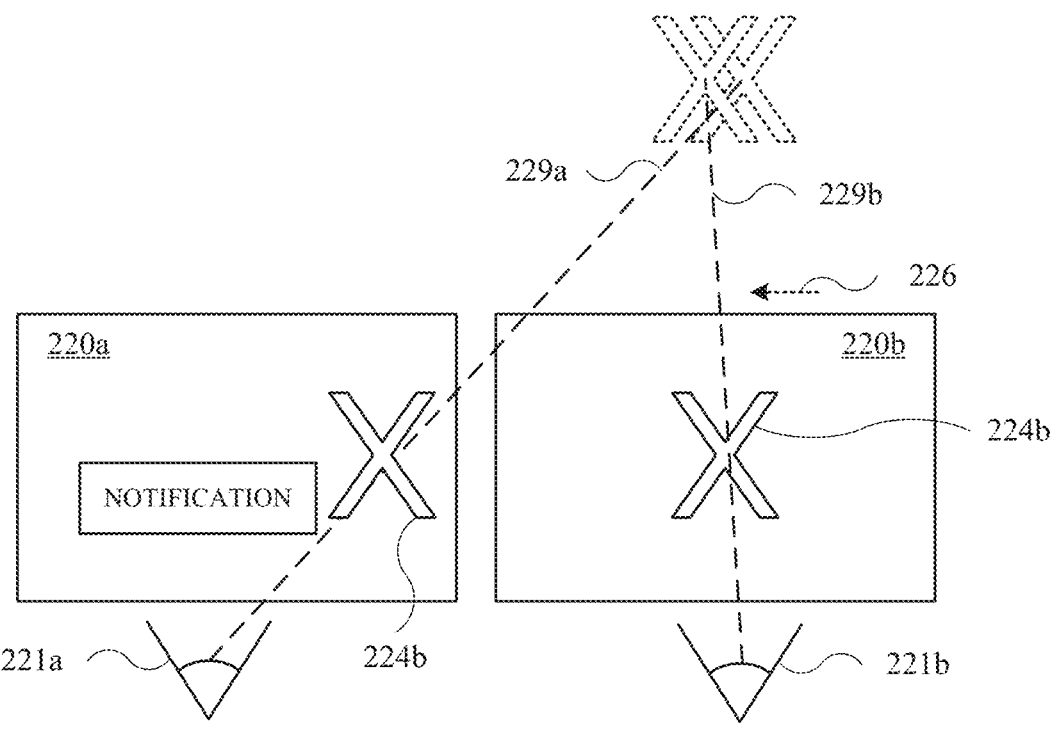
FIG. 6A illustrates a perspective view of an example of displays of an electronic device, further showing a notification presented on the displays, in accordance with aspects of the present disclosure.

FIG. 6A illustrates a perspective view of an example of displays 220a and 220b of an electronic device, further showing a notification 240 presented on the displays 220a and 220b, in accordance with aspects of the present disclosure. As non-limiting examples, the notification 240 may include an alert, a pop-up message, a Short Message Service (SMS, or text message), a software update indicator, a prompt requesting user action, or the like. In one or more implementations, an MR device may request the user focus on and prioritize notification 240 over the objects 224a and 224b. In this regard, an MR device may perform additional stereo offset to virtual content (e.g., the object 224b) to redirect the user's focus to the notification 240. As an example, the object 224b may be displaced in a direction of an arrow 226 on the display 220b. In this regard, the vector 229b is shifted relative to the vector 229a, representing a shift, or displacement, of the perceived location of the object 224b to the right eye 221b. Additionally, the additional stereo offset may maintain (e.g., not change) the scale of the object 224b based on the additional stereo offset.

Figure 6B:
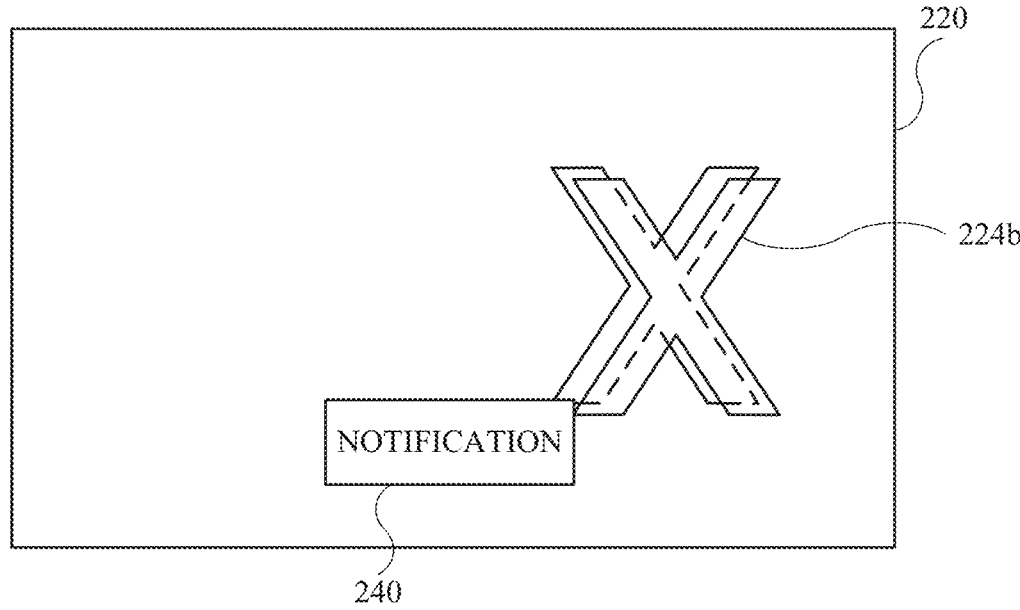
FIG. 6B illustrates a perspective view of an example of displays of an electronic device, further showing an operation performed on the content, in accordance with aspects of the present disclosure.

FIG. 6B illustrates a plan view showing the representation 220 of the content in a stereoscopic display mode, showing the object 224b subsequent to an operation (e.g., additional stereo offset), in accordance with aspects of the present disclosure. Based on the additional stereo offset applied to the object 224b (as shown in FIG. 6A), an intentional misalignment of the object 224b may simulate distortion effects on the object 224b. Accordingly, an MR device may cause a user to perceive double vision when viewing either or both of the objects 224a and 224b. As a result, a user may be more likely to focus on the notification 240, which may include targeted content by the MR device for the user to view. Beneficially, the user may view the notification 240 in a relatively short time, as the objects 224a and 224b are both misaligned by the additional stereo offset. Also, in one or more implementations, all content, with the exception of the notification 240, undergoes a stereo offset.

FIG. 7, FIG. 8, FIG. 9, and FIG. 10 illustrate flow diagrams showing examples of one or more processes that may be performed for providing an operation to virtual content, in accordance with implementations of the subject technology. A rendering engine (e.g., rendering engine 123 shown in FIG. 1), a compositor (e.g., compositing engine 127 shown in FIG. 1), or a combination thereof, may be used in part to conduct one or more steps of the example processes. For explanatory purposes, the respective processes shown in FIGS. 7-10 are primarily described herein with reference to the electronic device 105 (shown in FIG. 1), which may include an MR device. However, the respective processes shown in FIGS. 7-10 are not limited to the electronic device 105, and one or more blocks (or operations) of the respective processes may be performed by one or more other components of other suitable moveable apparatuses, devices, or systems. Further for explanatory purposes, some of the blocks of the respective processes are described herein as occurring in serial, or linearly. However, multiple blocks of the respective processes may occur in parallel. In addition, the blocks of the respective processes need not be performed in the order shown and/or one or more blocks of the respective processes need not be performed and/or can be replaced by other operations.

Figure 7:
FIG. 7 illustrates a flow diagram showing an example of a process that may be performed for providing an operation to virtual content, in accordance with implementations of the subject technology.
Figure 7:
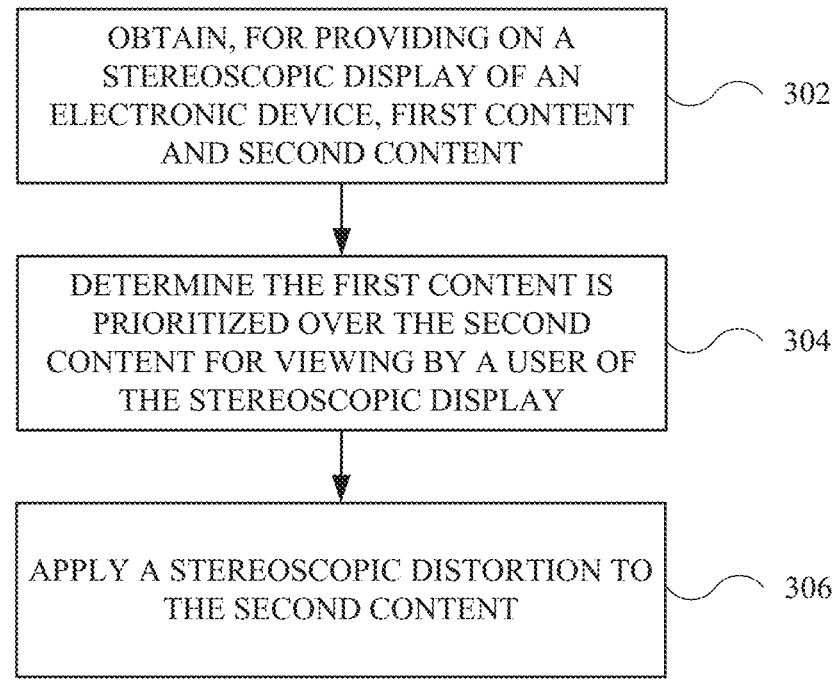

FIG. 7 illustrates a flow diagram showing an example of a process 300 that may be performed for providing an operation to virtual content, in accordance with implementations of the subject technology.

At block 302, first content and second content are obtained for providing on a stereoscopic display of an electronic device. In one or more implementations, each of the first content and the second content is virtual content (e.g., a virtual object). Alternatively, however, the first content may include a real world content (e.g., a real world object) in a real world environment. The first content and the second content may be presented to a user on each two displays of an MR device in a stereoscopic display mode.

At block 304, a determination is made that the first content is prioritized over the second content for viewing by a user of the stereoscopic display. As non-limiting example, the device may use gaze tracking information, boundary boxes, scene layers, an indication provided by an application running on an MR device that the first content is targeted content, or a combination thereof.

At block 306, a stereoscopic distortion is applied to the second content. The stereoscopic distortion may cause an adjustment to at least one of a position of a left-eye image or a position of a right eye-image. When the second content is presented on a stereoscopic display, the stereoscopic distortion the second content may cause the user to experience double vision when viewing the second content or otherwise cause the second content to be perceived as out of focus.

Figure 8:
FIG. 8 illustrates a flow diagram showing an alternate example of a process that may be performed for providing an operation to virtual content, in accordance with implementations of the subject technology.
Figure 8:
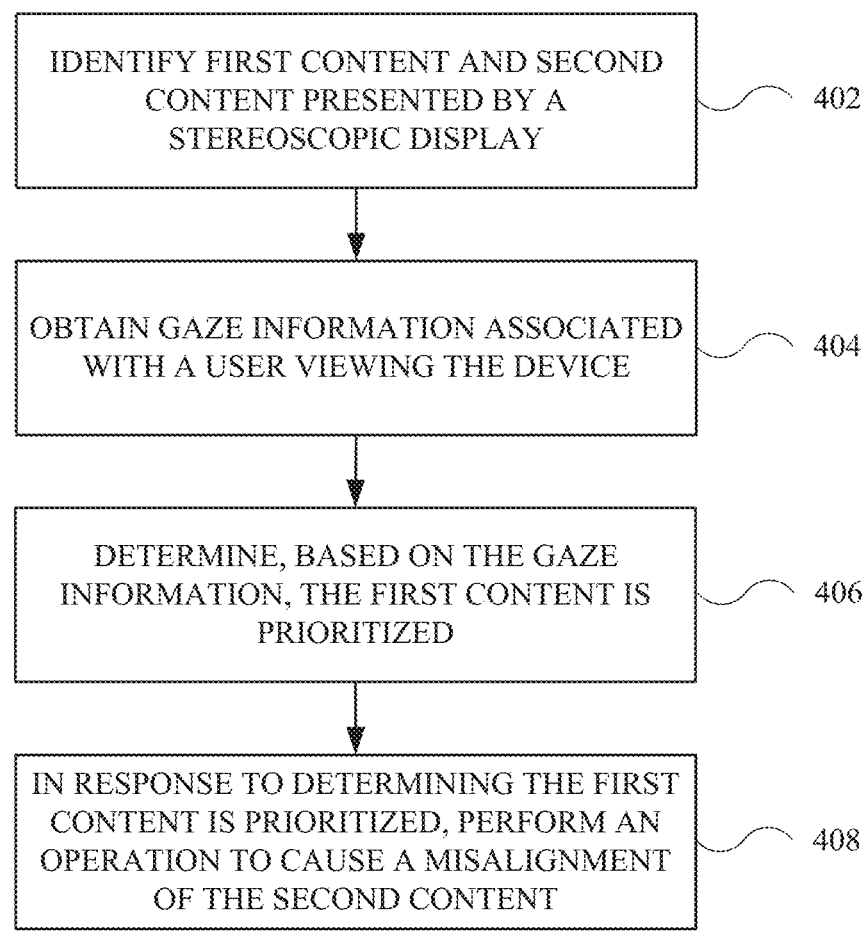

FIG. 8 illustrates a flow diagram showing an alternate example of a process 400 that may be performed for providing an operation to virtual content, in accordance with implementations of the subject technology.

At block 402, first content and second content are identified. In one or more implementations, the second content is presented on a stereoscopic display. The first content and the second content may be presented by a device. The first content and the second content may be presented on two displays, and further presented to a user in a stereoscopic display mode.

At block 404, gaze information associated with a user viewing the stereoscopic display is obtained. In one or more implementation, a device that includes the stereoscopic display may include one or more sensors used to track eye movements of the user. The gaze information may include gaze vectors that converge, or at least partially converge, on the content (e.g., first content) at which the user is looking.

At block 406, based on the gaze information, a determination is made that the first content is prioritized. In particular, the determination includes a determination that the first content is prioritized over the second content. In one or more implementations, the first content is targeted content on which the device requests the user focus.

At block 408, in response to determining the first content is prioritized, an operation is performed to cause a misalignment of the second content. For example, a stereo offset operation may be performed on the second content, which may cause the user to experience double vision when viewing the second content or otherwise cause the second content to be perceived as out of focus.

Figure 9:
FIG. 9 illustrates a flow diagram showing an additional, alternate example of a process that may be performed for providing an operation to virtual content, in accordance with implementations of the subject technology.
Figure 9:
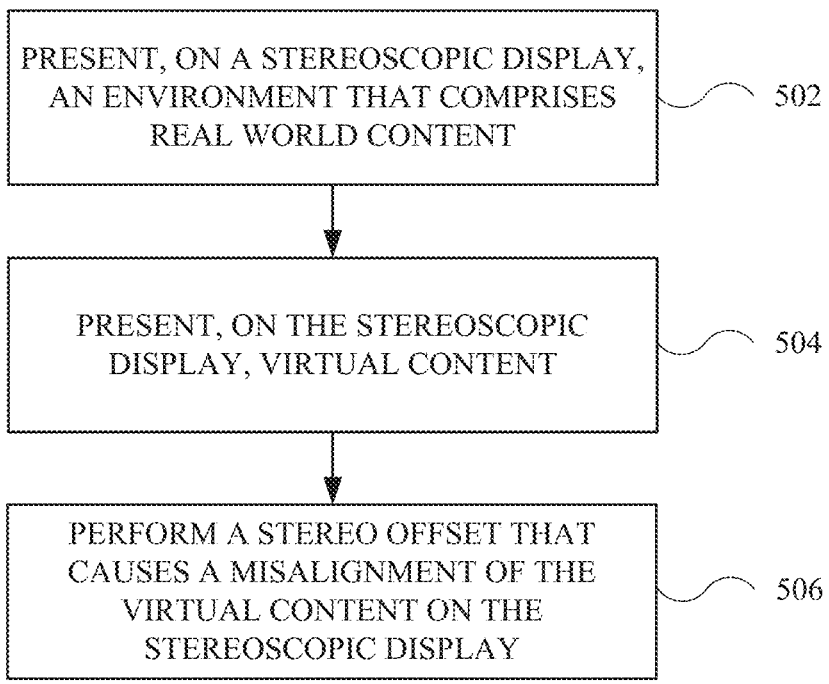

FIG. 9 illustrates a flow diagram showing an additional, alternate example of a process 500 that may be performed for providing an operation to virtual content, in accordance with implementations of the subject technology.

At block 502, virtual content is presented on a stereoscopic display. In one or more implementations, the stereoscopic display includes a transparent display configured to allow a user to view an environment that comprises real world content.

At block 504, a focal distance of the real world content is determined. In one or more implementations, an image sensor (e.g., camera) is used to determine gaze, and in particular, a vergence distance by using the image sensor to track a user's eyes.

At block 506, a stereo offset is applied that causes a misalignment of the virtual content on the stereoscopic display. The stereo offset may include an additional stereo offset that intentionally causes distortions effects such as double vision. As an example, the additional stereo offset may cause respective images viewable by a user's left eye and eye to be displaced, thus causing a user viewing content (e.g., virtual content) based on the images to perceive double vision.

Figure 10:
FIG. 10 illustrates a flow diagram showing an additional, alternate example of a process that may be performed for providing an operation to virtual content, in accordance with implementations of the subject technology.
Figure 10:
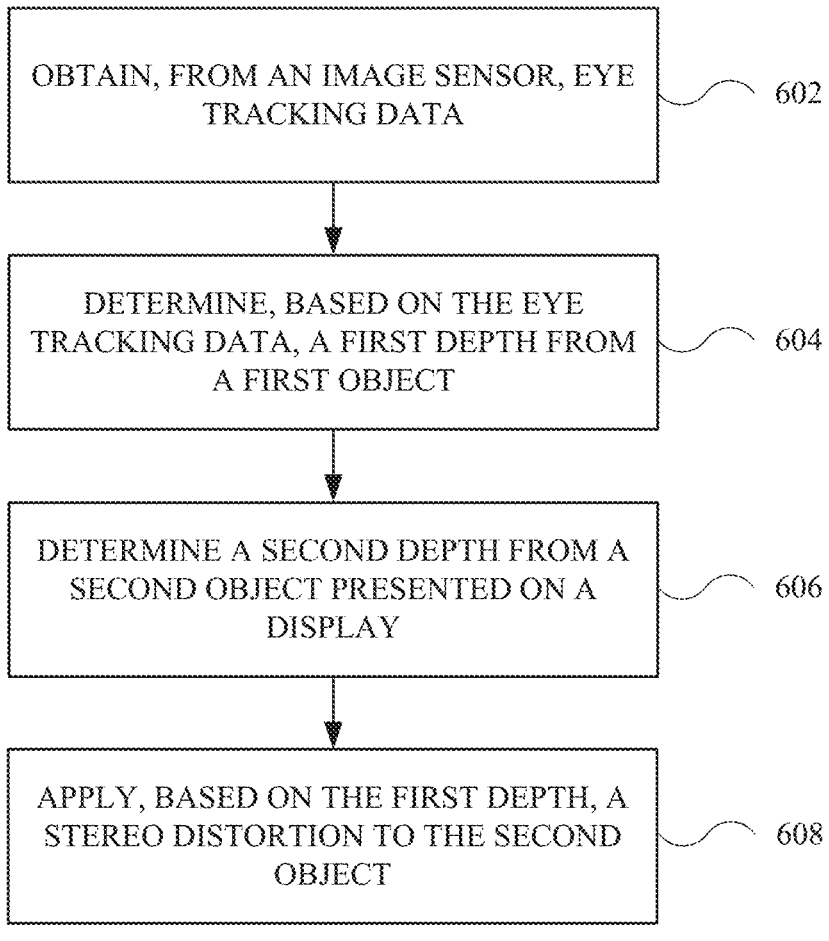

FIG. 10 illustrates a flow diagram showing an additional, alternate example of a process 600 that may be performed for providing an operation to virtual content, in accordance with implementations of the subject technology.

At block 602, eye tracking data is obtained from an image sensor. The image sensor may include one or more cameras.

At block 604, based on the eye tracking data, a first depth from a first object is determined, e.g., representing the depth of the first object from the user in the MR scene. The first distance may be based on convergence of a user's eyes, as determined from the image sensor. In one or more implementations, an MR device may estimate the first depth based on the eye tracking data.

At block 606, a second depth from a second object presented on a display is determined, e.g., representing the depth of the second object from the user in the MR scene. The second depth may be determined in part by the depth between the user and the display. In one or more implementations, the display is a see-through display.

At block 608, based on the first depth and the second depth, a stereo distortion is applied to the second object. For example, where the second depth is closer than the first depth, an additional disparity or stereo offset may be applied to the second object to simulate the effects on the user's perception of objects at the second depth when a user's eyes converge at the first depth. As another example, where the second object and the first object appear to the user as overlapping, then additional disparity may be added to the second object (e.g., where the second object is closer to the user than the first object) or disparity may be inversely modified (e.g., to simulate the effects on the user's perception of objects at a second, farther distance, when the user's eyes converge at a closer distance). In one or more implementations, the second object is presented on a transparent display using a stereo disparity based on the first distance and the second distance. Further, wherein the stereo disparity is based on a nominal stereo disparity corresponding to user focus at a depth of the second object, and an adjustment based on user focus at the estimated first distance.

Figure 11:
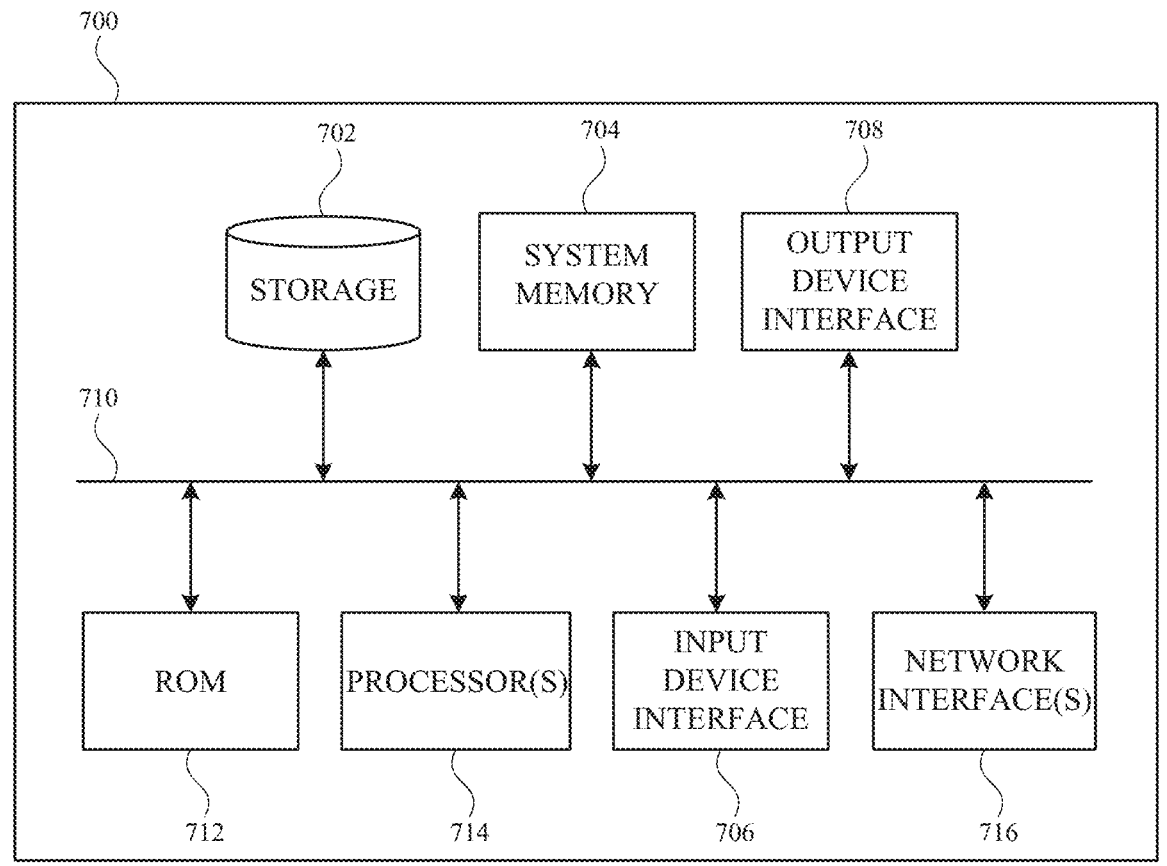
FIG. 11 illustrates an electronic system with which one or more implementations of the subject technology may be implemented.

FIG. 11 illustrates an electronic system 700 with which one or more implementations of the subject technology may be implemented. The electronic system 700 can be, and/or can be a part of, the electronic device 105 as shown in FIG. 1. The electronic system 700 may include various types of computer readable media and interfaces for various other types of computer readable media. The electronic system 700 includes a bus 710, one or more processing units 714, a system memory 704 (and/or buffer), a ROM 712, a permanent storage device 702, an input device interface 706, an output device interface 708, and one or more network interfaces 716, or subsets and variations thereof.

The bus 710 collectively represents all system, peripheral, and chipset buses that communicatively connect the numerous internal devices of the electronic system 700. In one or more implementations, the bus 710 communicatively connects the one or more processing units 714 with the ROM 712, the system memory 704, and the permanent storage device 702. From these various memory units, the one or more processing units 714 retrieves instructions to execute and data to process in order to execute the processes of the subject disclosure. The one or more processing units 714 can be a single processor or a multi-core processor in different implementations.

The ROM 712 stores static data and instructions that are needed by the one or more processing units 714 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store computer-readable instructions to carry out the various processes described herein. The system memory 704 may store any of the instructions and data that one or more processing units 714 may need at runtime. In one or more implementations, the processes of the subject disclosure are stored in the system memory 704, the permanent storage device 702, and/or the ROM 712 (which are each implemented as a non-transitory computer-readable medium). From these various memory units, the one or more processing units 714 retrieves instructions to execute and data to process in order to execute the processes of one or more implementations.

The bus 710 also connects to the input device interface 706 and output device interface 708. The input device interface 706 enables a user to communicate information and select commands to the electronic system 700. Input devices that may be used with the input device interface 706 may include, for example, alphanumeric keyboards and pointing devices (also called "cursor control devices"). The input device interface 706 may enable, for example, the display of images generated by electronic system 700. Output devices that may be used with the input device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 710 also couples the electronic system 700 to one or more networks and/or to one or more network nodes, such as the electronic device 105 shown in FIG. 1, through the one or more network interfaces 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, and/or any other optical or magnetic media. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

As described above, one aspect of the present technology is the gathering and use of data available from specific and legitimate sources for providing content that may cause a user to experience double vision when viewing the content. The present disclosure contemplates that in some instances, this gathered data may include personal information data that uniquely identifies or can be used to identify a specific person. Such personal information data can include audio data, voice data, demographic data, location-based data, online identifiers, telephone numbers, email addresses, home addresses, encryption information, data or records relating to a user's health or level of fitness (e.g., vital signs measurements, medication information, exercise information), date of birth, or any other personal information.

The present disclosure recognizes that the use of personal information data, in the present technology, can be used to the benefit of users. For example, the personal information data can be used for providing content on an MR device.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of presenting or generating virtual content on an MR device, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. A method, comprising:

obtaining, for providing on a stereoscopic display of an electronic device, first content and second content, wherein the second content is presented as a first rendering on a first display of the stereoscopic display and as a second rendering on a second display of the stereoscopic display;

determining the first content is prioritized over the second content for viewing by a user of the stereoscopic display; and applying a stereoscopic distortion to the second content, wherein based on the stereoscopic distortion the first rendering is misaligned with respect to the second rendering such that the second content appears out of focus on the stereoscopic display.

2. The method of claim 1, wherein performing the stereoscopic distortion comprises performing a stereo offset on the second content.

3. The method of claim 2, wherein performing the stereo offset comprises:

adjusting at least one of a first position of the second content in a left-eye image or a second position of the second content in a right-eye image; and providing the left-eye image and the right-eye image to the stereoscopic display.

4. The method of claim 1, wherein determining the first content is prioritized over the second content comprises obtaining gaze information.

5. The method of claim 4, wherein obtaining the gaze information comprises obtaining one or more gaze vectors directed toward the first content.

6. The method of claim 1, wherein determining the first content is prioritized over the second content comprises obtaining, from an application running on the electronic device, an indication that the first content is targeted content.

7. The method of claim 1, further comprising:

obtaining, based on one or more image sensors, a current focal distance of the user of the electronic device with regard to the first content;

obtaining a location of the second content; and determining, based on the current focal distance and the location, the stereoscopic distortion.

8. The method of claim 7, wherein applying the stereoscopic distortion to the second content causes a misalignment of the second content.

9. The method of claim 1, further comprising:

obtaining, from an image sensor, eye tracking data;

determining, based on the eye tracking data, a first depth from the first content;

determining a second depth from the second content presented on the stereoscopic display; and applying, based on the first depth, the stereoscopic distortion.

10. The method of claim 9, wherein determining the first depth comprises estimating, based on the eye tracking data, the first depth.

11. The method of claim 9, further comprising determining, based on the eye tracking data, that the first content is prioritized over the second content.

12. A non-transitory computer-readable medium, comprising:

computer-readable instructions that, when executed by a processor, cause the processor to perform one or more operations comprising:

identifying first content and second content, wherein the second content is presented as a first rendering on a first display of a stereoscopic display and as a second rendering on a second display of the stereoscopic display;

obtaining gaze information associated with a user viewing the stereoscopic display;

determining, based on the gaze information, the first content is prioritized; and in response to determining the first content is prioritized, performing an operation to cause a misalignment between the first rendering and the second rendering such that the second content appears out of focus on the stereoscopic display.

13. The non-transitory computer-readable medium of claim 12, wherein obtaining the gaze information comprises:

obtaining a first gaze vector directed toward the first content presented on the first display of the stereoscopic display; and obtaining a second gaze vector directed toward the first content presented on the second display of the stereoscopic display.

14. The non-transitory computer-readable medium of claim 12, wherein the misalignment causes a stereo offset of the second content.

15. The non-transitory computer-readable medium of claim 14, wherein providing the stereo offset comprises adjusting one or more images of the second content.

16. The non-transitory computer-readable medium of claim 12, wherein:

the first content comprises real world content, and the second content comprises virtual content.

17. The non-transitory computer-readable medium of claim 12, wherein:

the first content is presented by the stereoscopic display at a first focal distance relative to the user, the second content is presented by the stereoscopic display at a second focal distance relative to the user, and the second focal distance is less than the first focal distance.

18. The non-transitory computer-readable medium of claim 12, wherein the computer-readable instructions that, when executed by the processor, cause the processor to further perform one or more operations comprising:

identifying third content presented by the stereoscopic display; and performing the operation to cause the misalignment of the second content.

19. A system, comprising:

a memory; and a processor configured to execute instructions stored on the memory to:

present, on a stereoscopic display, virtual content, wherein the stereoscopic display comprises a transparent display configured to allow a user to view an environment that comprises real world content;

determine a focal distance of the real world content; and perform, based in part on the focal distance, a stereo offset that causes a misalignment of the virtual content on the stereoscopic display such that the virtual content appears out of focus on the stereoscopic display.

20. The system of claim 19, wherein the processor is further configured to determine the real world content is prioritized over the virtual content for viewing by the user of the stereoscopic display.

21. The system of claim 20, wherein determining the real world content is prioritized over the virtual content comprises obtaining gaze information.

22. The system of claim 19, wherein the misalignment causes a stereo offset of the virtual content.

23. The system of claim 19, wherein the processor is further configured to in response to determining the virtual content is prioritized over the real world content, perform a second stereo offset that removes the misalignment of the virtual content on the stereoscopic display.

* * * * *